(12) United States Patent
De et al.

(10) Patent No.: US 7,580,818 B2
(45) Date of Patent: Aug. 25, 2009

(54) MISSION PROFILING (75) Inventors: Piali De, Harvard, MA (US); John A. Cogliandro, Dedham, MA (US); John E. Rannenberg, N. Kingstown, RI (US); Joe R. Wang, Boston, MA (US); Amir W. Habboosh, Somerset, MA (US)

(73) Assignee: Raytheon Company, Waltham, MA (US)

( * ) Notice: Subject to any disclaimer, the term of this patent is extended or adjusted under 35 U.S.C. 154(b) by 436 days.

(21) Appl. No.: 11/265,802

(22) Filed: Nov. 1, 2005

(65) Prior Publication Data
US 2008/0015909 A1 Jan. 17, 2008

(51) Int. Cl.
*G06F 9/455* (2006.01)

(52) U.S. Cl. .................. 703/6; 703/1; 705/1; 705/7

(58) Field of Classification Search .......... 703/6, 703/1; 705/1, 7, 9, 10; 340/511; 707/100; 379/265.02, 265.05
See application file for complete search history.

(56) References Cited

U.S. PATENT DOCUMENTS

| | | | |
|---|---|---|---|
| 4,584,578 A | 4/1986 | Brauns et al. ............ 342/59 |
| 6,122,572 A | 9/2000 | Yavnai ..................... 701/23 |
| 6,789,054 B1* | 9/2004 | Makhlouf ................. 703/6 |
| 6,816,800 B2 | 11/2004 | Heiland ................. 702/109 |
| 2003/0149610 A1 | 8/2003 | Rowan et al. | |
| 2003/0190589 A1 | 10/2003 | Lechner .................. 434/43 |
| 2003/0213358 A1 | 11/2003 | Harding | |
| 2004/0015375 A1 | 1/2004 | Cogliandro | |
| 2004/0267395 A1 | 12/2004 | Discenzo et al. ......... 700/99 |
| 2005/0004723 A1 | 1/2005 | Duggan et al. ........... 701/24 |
| 2005/0007249 A1* | 1/2005 | Eryurek et al. ........ 340/511 |
| 2005/0021541 A1* | 1/2005 | Rangadass et al. ..... 707/100 |
| 2005/0197991 A1 | 9/2005 | Wray et al. ............. 706/50 |
| 2005/0212523 A1 | 9/2005 | Chang et al. .......... 324/511 |
| 2005/0273377 A1* | 12/2005 | Ouimet et al. .......... 705/10 |
| 2006/0147025 A1* | 7/2006 | Dezonno et al. .... 379/265.02 |
| 2006/0229921 A1* | 10/2006 | Colbeck .................. 705/7 |
| 2006/0229926 A1* | 10/2006 | Homann et al. ......... 705/9 |
| 2006/0235707 A1* | 10/2006 | Goldstein et al. ........ 705/1 |
| 2007/0016432 A1* | 1/2007 | Piggott et al. ........... 705/1 |
| 2007/0074182 A1 | 3/2007 | Hinchey et al. ....... 717/136 |

FOREIGN PATENT DOCUMENTS

WO  WO 03/083800 A1  10/2003

OTHER PUBLICATIONS

Notification of transmittal of the International Search Report and the Written Opinion of the International Searching Authority, or the Declaration, (Form PCT/ISA/220), dated Feb. 13, 2007.

(Continued)

*Primary Examiner*—Paul L Rodriguez
*Assistant Examiner*—Kandasamy Thangavelu
(74) *Attorney, Agent, or Firm*—Daly, Crowley, Mofford & Durkee, LLP (57) ABSTRACT

A method for mission profiling includes generating a human model including human activities and generating a system model including system functions. The method also includes generating an operational node model, including operational activities; and integrating the human model, the system model and the operational model to form an integrated mission model.

36 Claims, 3 Drawing Sheets

OTHER PUBLICATIONS

International Search Report. (Form PCT/ISA/210).

Written Opinion of the International Searching Authority. (Form PCT/ISA/237).

Lin Zhang, et al., "A Coloured Petri Net based Tool for Course of Action Development and Analysis", ACM International Conference Proceeding Series, XP002417643, vol. 145, 2002, pp. 125-134.

Huei Wan Ang, et al., "Improving the Practice of DoD Architecting with the Architecture Specification Model", XP002417644, [Online] Jun. 2002, The Mitre Corporation, 10 pages, http://www.mitre.org/work/tech_papers/tech_papers_05/05_0423/05_0423.pdf>.

Bondavalli A., et al., "DEEM: A Tool For The Dependability Modeling and Evaluation of Multiple Phased Systems", Proceedings International Conf. on Dependable Systems and Networks, XP1000988657, IEEE Comp. Soc, US, Jun. 25, 2000, pp. 231-236.

Wagenhale, L.W., et al., "Creating Executable Models of Influence Nets with Colored Petri Nets", XP002417645, Int'l Journal on Software Tools for Technology Transfer, Springer-Verlag, Germany, vol. 2, No. 2, Dec. 1998, pp. 168-181.

Mura, Ivan, et al. "Hierarchical Modeling & Evaluation of Phased-Mission Systems", XP002417646, IEEE Transactions on Reliability, 1999, vol. 48, No. 4, pp. 360-368.

Kristensen, et al. "Application of Coloured Petri Nets in System Development", XP019007958, vol. 3098, 2004, pp. 626-685.

Piali De et al., "Design and Analysis of Integrated Fires in a Future Mission", Briefing to National Fire Control Synposium, Orlando, Florida, Jul. 25-28, 2005, 21 pages.

Notification of Transmittal of the International Search Report and the Written Opinion of the International Searching Authority, or the Declaration dated Nov. 25, 2008, PCT/US 07/05741, 8 pages.

File downloaded from PAIR for U.S. Appl. No. 11/392,222, filed Mar. 28, 2006, file through Dec. 17, 2008, 257 pages.

Notification of Transmittal of the International Search Report and the Written Opinion of the International Searching Authority, or the Declaration, PCT/US2008/063673 dated Dec. 22, 2008.

U.S. Appl. No. 12/120,280, Piali De, filed on May 14, 2008, 38 pages.

International Preliminary Report on Patentability (Form PCT/IB/373) and Written Opinion (Form PCT/ISA/237) for PCT/US2006/040355, dated May 15, 2008, 10 pages.

David Wallace, "Language use in a branching Universe", Balliol College, Oxford, U.K., Dec. 2005, 21 pages.

Kuter, et al., "Interactive Planning under Uncertainty with Causal Modeling and Analysis", Univ. Of Maryland, Dept. of Computer Science; Rome Laboratory, 2003, 8 pages.

Amant et al., "Data Analysis Assistance for Interactive Planning", North Carolina State University, Dept. of Computer Science, 2000, 8 pages.

Lumbo, Master of Science in Organizational Dynamics Theses, Applications of Interactive Planning Methodology, Submitted to the Program of Organizational Dynamics, Univ. of Pennsylvania, 2007, 72 pages.

Ambite, et al., "Getting from Here to There: Interactive Planning and Agent Execution for Optimizing Travel", 2002, 8 pages.

Kuter, et al., "Interactive Course-of-Action Planning Using Causal Models", Proceedings of the Third Int'l Conf. on Knowledge Systems for Coalition Operations (KSCO-2004), Oct. 2004 (postponed), 12 pages.

Gary Borchardt, "Interactive Planning and Monitoring" Artificial Intelligence Laboratory, Mass Inst. of Tech., http://www.ai.mit.edu, 2000, pp. 205-206.

Perini et al., "An Interactive Planning Architecture, The Forest Fire Fighting case", I.R.S.T., povo, Italy, 1996, 11 pages.

Kim, et al., "A Planner Independent Approach to Human Interactive Planning", Univ. of So. California and Inst. For Creative Technologies, Aug. 9, 2003, 18 pages.

Weir, "Learning From a Plan-Based Interface", Comput. Educ., vol. 12, No. 1, pp. 247-251, 1988.

Ferguson et al., "TRIPS: An Integrated Intelligent Problem-Solving Assistant", Univ. Of Rochester, Dept. Of Computer Science, 1998, American Assoc. for Artificial Inteligence, (www.aaai.org), 6 pages.

Anderson, et al., "An Integrated Theory of the Mind", Psychological Review, 2004, vol. 111, No. 4, pp. 1036-1060.

ACT-R, "About ACT-R", http://act-r.psv.cmu.edu/about/, Dept. of Psychology, Carnegie Mellon Univ., webmaster@act-r.psy.cmu.ed, printout dated Oct. 31, 2008, 4 pages.

Horling, et al. "The Taems White Paper", Univ. of Mass., Amherst, MA, 2005, 6 pages.

Notification Concerning Transmittal of Copy of International Preliminary Report on Patentability (Chapter 1 of the Patent Cooperation Treaty); PCT/US2007/005741 dated Jan. 22, 2009.

Horling, et al. "The Taems White Paper", Univ. of Mass., Amherst, MA, 1999, 6 pages.

Perini et al., "An Interactive Planning Architecture, The Forest Fire Fighting case", I.R.S.T., Povo, Italy, 1995, 11 pages.

* cited by examiner

MISSION PROFILING

TECHNICAL FIELD

This invention relates generally to mission and system design and optimization and more specifically to mission profiling.

BACKGROUND

There have been a number of methods and technologies directed to improving performance and efficiency of an organization to achieve their goals. Some of these methods and technologies have been implemented into systems, for example, a Systems Engineering V (SE V) model. Benjamin Blanchard's work in systems engineering described the general process steps associated with the SE V model, from requirements design through system descriptions and functional descriptions to system design and validation. Other technologies and methods include a Business Process Re-Engineering (BPR) model by Michael Hammer and others, which maps processes in a linear fashion by observing inputs and outputs and observing duplicative efforts within an enterprise. Further technologies include the Integrated Computer-Aided Manufacturing (ICAM) Definition Languages (IDEF) Modeling technique developed by the United States Air Force. Still other technologies that improve performance and efficiency of the organization include RATIONAL ROSE REALTIME®, RHAPSODY®, Extend and other graphical tools.

SUMMARY

In one aspect, the invention is a method for mission profiling. The method includes generating a human model including human activities, generating a system model including system functions, and generating an operational node model including operational activities. The method also includes integrating the human model, the system model and the operational model to form an integrated mission model.

In another aspect, the invention is an apparatus. The apparatus includes a memory that stores executable instructions for mission profiling and a processor that executes instructions for executing an integrated mission model. The integrated mission module includes a human model including human activities, a system model including system functions and an operational node model including operational activities.

In a further aspect, the invention is an article. The article includes a machine-readable medium that stores an integrated mission model and executable instructions for executing the integrated mission model. The integrated mission module includes a human model including human activities, a system model including system functions, and an operational node model including operational activities.

DETAILED DESCRIPTION

Mission profiling is a process which defines, optimizes, and validates doctrines, objectives and missions, as well as processes and systems, sub-systems and operations that support the missions. A doctrine is a set of fundamental principles, which guide the actions of persons in support of objectives. The objectives are goals that organizations would like to achieve or maintain. For example, one objective for a corporation, sometimes called a vision, is to have world-class customer service. A mission is a set of tasks, together with a purpose, which indicates the action to be taken and the reason for performing the task to achieve the objective. Missions are ultimately in support of the objective. A mission may include one or more activities and/or one or more systems for achieving a particular outcome. Thus, missions are tasks for achieving the objective while adhering to a doctrine.

Historically, systems have been designed to perform to a set of requirements, but not specifically designed to accomplish a particular mission. For example, a system, such as an aircraft weapons system, is designed to fly at a certain speed and deliver a certain payload to a target, but the design of the aircraft may not meet a particular mission need. Included herein is a novel approach to mission profiling that integrates people and systems at all levels to ensure that each person and system functions together in order to accomplish the mission.

The mission profiling process described herein may be implemented with the Department of Defense Architecture Framework (DODAF) used by the United States military. The process uses DODAF framework products as inputs to the mission profiling process. The DODAF provides the basis for developing and presenting architecture descriptions in a uniform and consistent manner. A purpose of the DODAF is to ensure that architecture descriptions developed by DOD commands, services and agencies contain applicable views such as all views (AVs), operational views (OVs), system views (SVs), and technical standard views (TVs), and that the architecture descriptions may be compared and related across organizational boundaries, e.g., joint military commands, multi-national forces, and so forth. To accomplish this, the DODAF defines framework products to capture specific architectural views. The standard DODAF products include two AVs, nine OVs, thirteen SVs, and two TVs. While a DODAF may be used herein, the inputs for the mission profiling process may come from any source and is not limited to DODAF framework products. Mission profiling process inputs may include a corporate vision and mission statements, project financial and performance goals, policy and procedural manuals, process diagrams and process manuals, subject matter expert interviews, flowcharts and both written and verbal methods for business processes.

Further, the mission profiling process may use a Colored Petri Net (CPN) model to represent the activities of a system or process that is part of the mission. A Colored Petri Net (CPN) is a modeling language used to form a mathematical representation of a discrete distributed system. A CPN includes two fundamental building blocks: places and transitions, which are connected by directional arcs. The CPN may be seen as a graphical model, where the places are denoted by ellipses, the transitions are denoted by rectangles, and the directional arcs are denoted by arrows. Places are marked by tokens, which may be arbitrary and complex types. Collectively, the set of tokens at any given time, denote the state of the CPN. Each transition is bracketed by one or more input places and one or more output places. If the input places contain the necessary tokens, a transition is enabled. The enabled transition will fire, if the conditions on the input arc and any guard condition on the transition itself are satisfied. When a transition is fired, the state of the CPN is changed: tokens are removed from the input places and new tokens are added to the output places. Arc and guard conditions for a transition may be deterministic or stochastic functions and transitions may be modeled with temporal properties. While a CPN is described herein, other mathematical representations or other executable models such as a system dynamic model, or other bipartite directed graph type model may be used in the mission profiling process, and may be used in conjunction with a CPN or other type of representation Referring to FIGS. 1 and 2, process 10 is an exemplary process for mission profiling. Process 10 generates an integrated mission model using a subprocess 20. Subprocess 20 gathers data (22). For example, one or more customer interaction meetings are conducted to gather information from an organization to determine their objectives, doctrine and mission. The information may come directly from documents, such as organizational literature or flow charts, or the information may be derived from interviews such as interviews conducted by subject matter experts, for example, or both through documents and interviews. In one example, the information may be obtained from a Concept of Operations (CONOPS) document. In another example, as will be described herein, gathering data (22) may also include information learned or data generated from optimizing the integrated mission model (40) and/or from validating (60) the integrated mission model.

Figure 2:
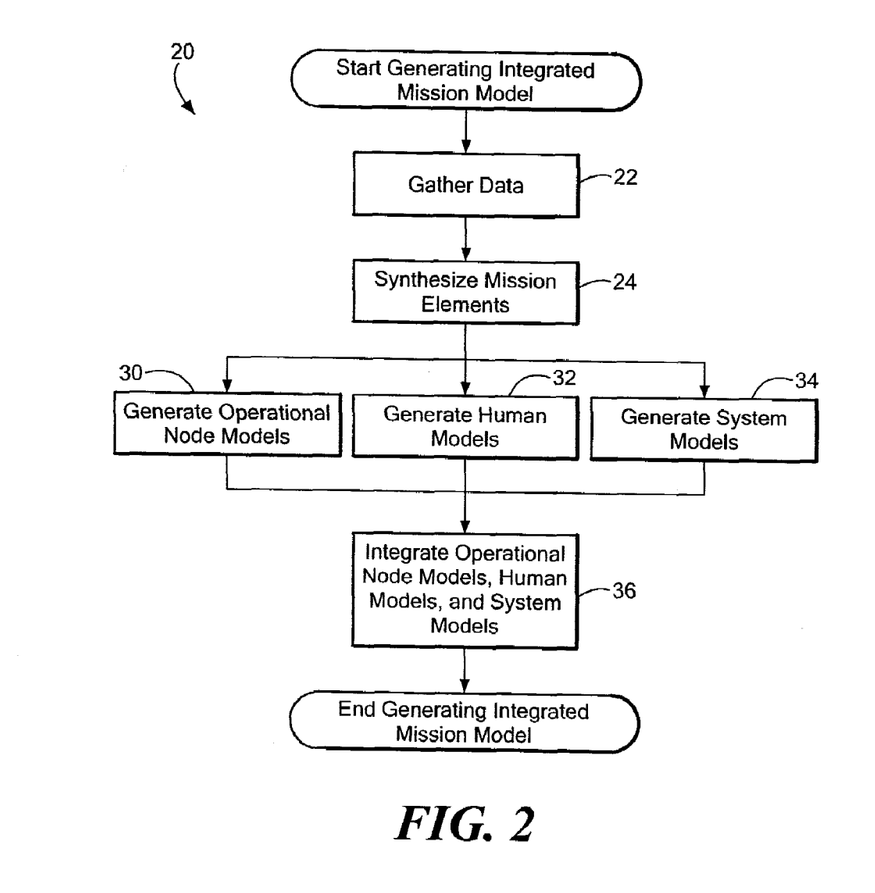
FIG. 2 is a flowchart for generating an integrated mission model.

Subprocess 20 synthesizes mission elements from the gathered data (24). Mission elements may include operational nodes, humans and systems, which will perform the mission. For example, synthesizing mission elements may include identifying operational nodes, humans and systems and their respective functions. For example, operation views, such has DODAF Operational Node Connectivity Description (OV-2) and Operational Information Exchange Matrix (OV-3), and activity-based models, such as DODAF Operational Activity Model (OV-5), are reviewed to yield details on the mission descriptions. OV-2 includes operational nodes along with connectivity and information exchange lines between nodes. An operational node may represent an organization involved with the mission, for example, people, systems or a combination thereof. OV-3 includes information exchanges between nodes and relevant attributes of that exchange. Relevant attributes typically focus on the specific aspects of the information flow and the information content. For example, performance attributes may include timeliness and periodicity. In another example, security attributes may include accountability, protection and classification. OV-5 includes capabilities (system functions), operational activities, relationships among activities, input and outputs. OV-5 may also include cost, performing nodes or other pertinent information.

Subprocess 20 generates operational node models (30). For example, generating operational node models may include generating a Colored Petri Net (CPN) model of the operational activities and data that define a mission. The CPN model, or other actionable representation, for an operation node depicts the operational activities that may occur in a node, with associated information inputs and outputs. The operational node models may be developed with varying degrees of fidelity. An example of an operational node is a Marine Corps Infantry battalion Fire Support Coordination Center (FSCC). Included in its model are the activities (along with inputs and outputs) that are performed inside that FSCC. For example, "Approve Call for Fire" is a relatively high-level operational activity, which may be sufficient in some mission models. However, if necessary, "Approve Call for Fire" may be further decomposed to lower-level operational activities, such a Process Request for Fire Message, Plot Target Location Consult with Commander's Guidance, Evaluate Weapon Status Approve Request. In another example, a financial institution includes a high level operational activity of check clearance. Check clearance is comprised of several lower level operational activities including key entry, account validation, account reconciliation, and so forth.

A separate operational node model may be generated for each operational node in the mission. The CPN model for each operational node may be re-used in any mission model, since the sequencing of activities within a node and in between nodes may be mission specific and not in the operational node model. Instead, the sequencing may be separately modeled, for example, during integrating human, system and operational node models (36).

In one example, the inputs for generating an operation node may include information obtained using DODAF OV-2, OV-3, OV-5 products or any operational framework.

System descriptors are used to identify the systems and communication methods that are used within each operational node. Systems are described in terms of the functions that they can perform with associated inputs and outputs. For instance, a fire control system will perform the function of prioritizing targets for which the fire control system needs to know various target characteristics, this body of data is the system descriptor. The financial institution automated check clearing system is identified at a high level so that the financial institution automated check clearing system can communicate with other systems. On a lower level the financial institution automated check clearing system relies on several inputs and produces two outputs. The inputs may include check type, financial institution code, account code, transaction amount, and so on. The outputs include "approved" or "declined". For example, system descriptors may be obtained from DODAF System Interface Description (SV-1) and Systems Communication Description (SV-2). SV-1 includes identification of system nodes, systems, and system items and their interconnections within and between system nodes. System nodes are systems used to accomplish the mission. SV-2 includes system nodes, systems and system items, and their related communication architectures. An architecture defines "who" can communicate with "whom" and through "what" device.

The operational activities may be partitioned into those operational activities supported by systems and those operational activities supported by humans. For example, the information used for partitioning may be obtained from DODAF Operational Activity to Systems Function Traceability (SV-5). SV-5 includes mapping of system functions to operational activities. The operational node models may be validated to determine that it is a proper representation.

Subprocess 20 generates human models (32). With the partitioning of the operational activities into system functions and human activities, the human models for individual or groups of people are generated that support an operational node. The human model represents the human activities, the triggers for a human activity and the outputs from the human activities. For example, the human activities information may be obtained from DODAF Organizational Relationships Chart (OV-4). OV-4 includes organizational role or other relationships among organizations. Human activities may be obtained through an interview process, or a combination of documentation review and interviews.

In one example, the human models are represented as CPN models, which may be re-used with other missions. The human models may be validated to determine that they are proper representations, for example, by showing the human models to mission planners.

Subprocess 20 generates system models (34). For each system that supports the mission operation, a CPN model of the system functions provided by the system is generated, which includes inputs and outputs. In one example, DODAF System Functionality Description (SV-4) may provide a baseline for generating the systems models. SV-4 includes functions performed by systems and system data flows among system functions.

System models may be developed with varying degrees of fidelity. For example, in some cases it may be important to identify a system function based on its inputs and outputs to verify interoperability with other systems. In other cases, it may be necessary to model a level of system functionality to facilitate performance modeling.

In one example, the system models are represented as CPN models, which may be re-used with other missions. The system models may be validated to determine that they are proper representations, for example, by showing the system models to mission planners. Subprocess 20 integrates the operational node models, the human models and the system models to form an integrated mission model (36). Human activities are mapped with corresponding system functions. The mapping includes synchronizing the human activities with the system functions. Human activities and system functions are mapped to operational activities. The mapping includes synchronizing the human activities and system functions with the operational activities. For example, DODAF SV-5 may be used for mapping system functions and human activities to operational activities.

Following the mapping of system and human functions to operational activities, the operational activities that constitute the mission are sequenced. Sequencing implies that the mission model reflects the order in which activities can (but not must) happen. For instance, in a military mission, an observer may not target a threat until he has a commander's guidance on what constitutes a threat. So sequencing introduces a constraint in the mission but does not stipulate the exact order in which all activities might occur. For example, DODAF Operational Event-Trace Description (OV-6c) may be used to determine the sequencing. OV-6c is one of three framework products used to describe operational activity. OV-6c includes trace actions in a scenario or sequence of events. The result of the mapping and sequencing is an integrated mission model, which is an executable and analyzable CPN model of the mission.

Figure 1:
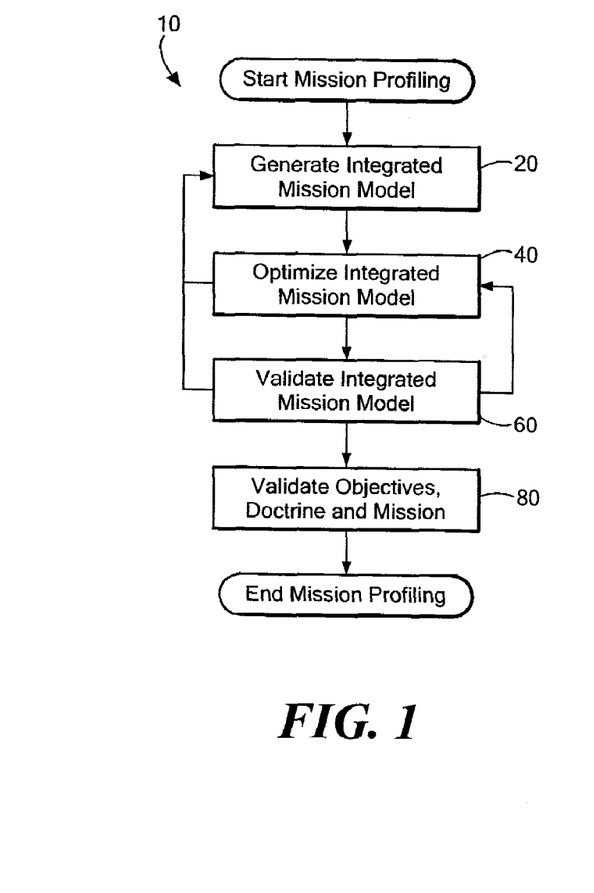
FIG. 1 is a flowchart for mission profiling.
Figure 3:
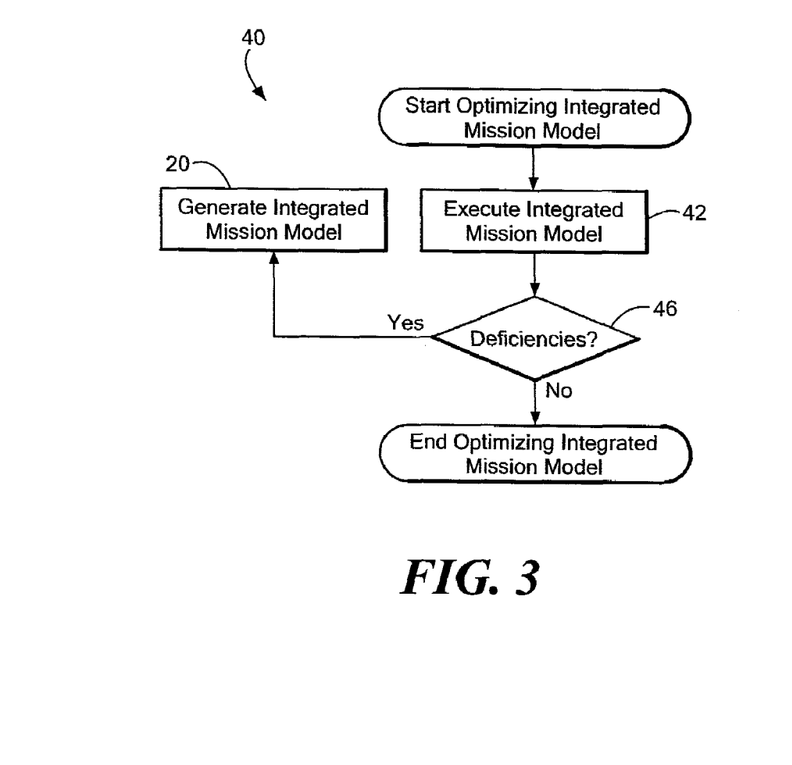
FIG. 3 is a flowchart for optimizing the integrated mission model.

Referring to FIGS. 1 and 3, process 10 optimizes the integrated process centric mission model using a subprocess 40. Subprocess 40 executes the integrated process centric mission model (42). Subprocess process 40 determines if there are any deficiencies with the integrated model (46). For example, the deficiencies may be bottlenecks, timing issues, sequence issues, and improper logic breaks. Other deficiencies may be determined from performance characteristics of the mission, such as measures of performance linked to the objective. For example, a deficiency may found if the integrated model does not execute or executes improperly because human activities are not properly aligned with operational activities or supported by requisite systems. For instance, military transport aircraft are expected to carry an operations battalion into a battlefield environment, but executing the integrated mission model indicates that it would take three military aircraft to execute the mission. Using two transport aircraft would improve efficiency by reducing the number of fighter support required during stages of the mission but leave the mission in a deficient state not immediately apparent without the analysis provided by the integrated model. In another example, the human activities indicate that the operations battalion carries additional communications equipment not accounted for in an operations deployment document because the communications equipment is typically pre-deployed by a covert reconnaissance team. Eliminating the communications equipment from being transported would reduce the number of aircraft from three to two, and increasing efficiency and reducing risk of detection and loss of aircraft. Thus, by optimizing the integrated mission model in this example, unnecessary duplicative activities are indicated and may be removed to improve efficiency. If there are deficiencies with the integrated model, subprocess 40 returns to generating the integrated mission model (20).

Figure 4:
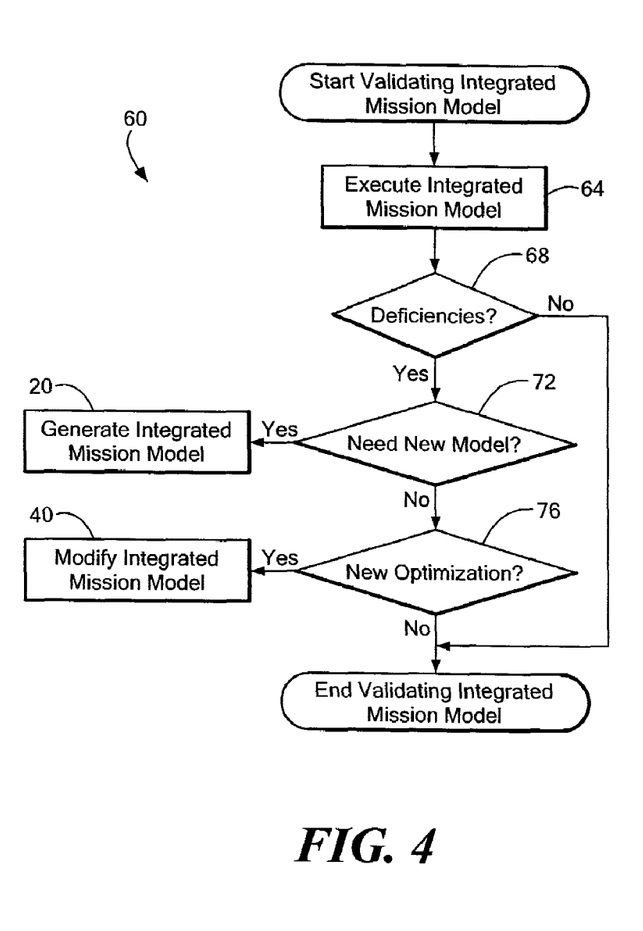
FIG. 4 is a flowchart for validating the integrated mission model.

Referring to FIGS. 1 and 4, process 10 validates the integrated mission model by using a subprocess 60. Subprocess 60 executes the integrated mission model (64). Live or simulated data may be inputted into the integrated mission model. Subprocess process 60 determines if there are any deficiencies with the integrated model (68). For example, it was expected that a particular temporary airfield in the jungle should do fifty flight sorties in a day, but simulations on the integrated mission model indicated that the actual performance will be forty sorties a day thereby indicating a deficiency. After analyzing the integrated mission model to determine the activities required during an air sortie, it is determined that a deficiency exists in an aircraft maintenance manual. After investigation, it was determined that that the aircraft maintenance manual required lengthy fuel inspections of each aircraft for fuel leaks. The inspection of leaks was required only for cold weather environments, but that requirement was never pointed out in the manual (and therefore modeled accordingly). Thus, by using the integrated mission model, deficiencies in systems, operations activities and human activities are easily identified. In other examples, training, facilities or management decisions may be modified to ensure that mission expectations are met.

If there are deficiencies, subprocess 60 determines if a new integration model is needed (72). If a new integration model is needed, subprocess 60 returns to generating the integrated mission module (20). If a new integration model is not needed, subprocess 60 determines if further optimization is needed. If further optimization model is needed, subprocess 60 returns to optimizing the integrated mission module (40).

Referring back to FIG. 1, process 10 validates the objectives, doctrine and mission (80). For example, it is determined that the integration model functions properly; however, the performance continues to fall short of mission expectations. For example, the mission goal of disabling a tank division by using an artillery unit is expected to be two hours, but the integrated mission module indicates that it will take four hours, because the artillery guns fire insufficient number of rounds in an hour. Until newer guns are designed and acquired, the expectations cannot be met and so the mission goal is changed or other work-arounds are designed into the mission. In other examples, training, facilities or management decisions may be modified to account for not meeting or exceeding mission expectations.

The mission profiling process 10 emphasizes an iterative process, which improves the understanding of the mission to a mission planner, allows for a better representation of the mission and manages the mission planner's expectations of actual mission results.

The mission profiling process 10 allows for analysis of complex missions that involve multiple, asynchronous and concurrent events. The mission profiling process 10 mitigates problems associated with stand-alone systems development that lead to integration issues in meeting mission needs. By modeling the overall mission profiling process and decision points, integration issues are mitigated. Typical integration issues and problems such as bottlenecks, breaks in logic or functional flow and sub-optimal decision paths are found between systems, sub-systems and people implementing the mission. These problems and discontinuities are discovered and mitigated before final system design.

The mission profiling process 10 may be used throughout the mission development lifecycle, which allows for the optimization of the mission in relationship to its goals at each step of the mission development process. The mission profiling process may be used iteratively, and may be run multiple times with or with-out all variables being intact, so that various scenarios and dependencies may be viewed, analyzed and optimized, ultimately validating a range of mission inputs; from the goals of the top level doctrine all the way down to the sub-systems and humans and training of humans that support that doctrine.

The mission profiling process 10 provides feedback, performance metrics and data on the resulting outcome of the doctrine, vision and mission as currently designed to determine their effectiveness. In a war related test of doctrine, a simulated feedback may save lives and resources. In a business related test of doctrine and vision, a simulated feedback may improve financial performance strategic formulation and market acceptance for example.

The mission profiling process may be iterative and may follow a mission and/or system development though an entire lifecycle, from conceptual inception through fielding and support and retirement. At each step along the lifecycle, various representations of both humans and systems may be replaced by real humans or systems or improved representations for a higher fidelity mission profile. The fidelity of the model may increase as more is learned about a system as the system goes from conceptual design, to final design, to fielding and so forth. These newer representations may be integrated into the integrated mission model at any time, and the integrated mission model may be re-run for new measures of performance.

Figure 5:
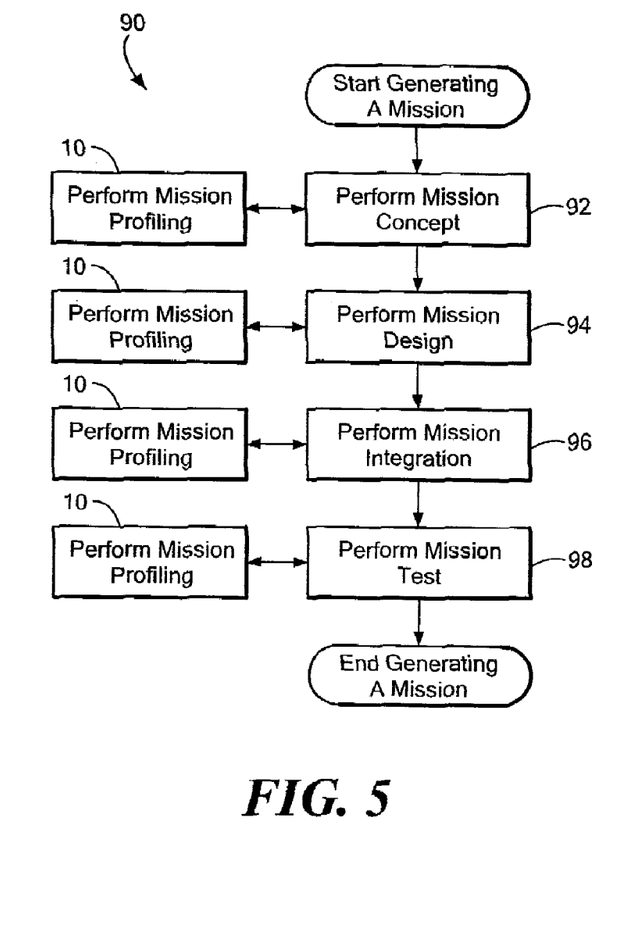
FIG. 5 is a flowchart for generating a mission.

Referring to FIG. 5, mission profiling process 10 may be used also to generate a mission. For example, an exemplary process for generating a mission uses a process 90. Process 90 performs a mission concept (92). For example, the mission elements and the interactions (mapping) between the mission elements are selected by a mission planner. Process 90 performs mission profiling (10). In one example, mission profiling 10 is performed iteratively to enable a planner to decide whether, for example, the proper mission elements are included and their interactions are acceptable.

Process 90 performs a mission design (94). For example, the interactions (mapping) between the mission elements are fixed. Process 90 performs mission profiling (10). In one example, mission profiling (10) is performed iteratively to enable a planner to decide whether, for example, the proper mission elements are included and their interactions are acceptable.

Process 90 performs a mission integration (96). For example, some of the mission elements are fixed. Process 90 performs mission profiling (10). In one example, mission profiling (10) is performed iteratively so that over time all or most of the mission elements become fixed.

Process 90 performs a mission test (98). Process 90 performs mission profiling (10). In one example, mission profiling 10 is performed iteratively to enable a planner to decide whether, for example, the mission meets a mission planner's expectations.

Figure 6:
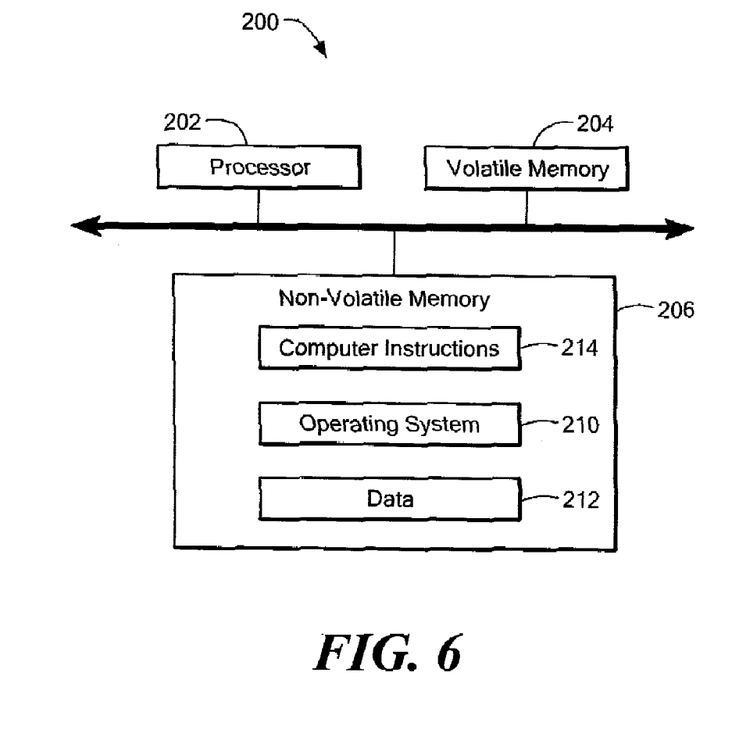
FIG. 6 is a block diagram of a computer system on which the integrated mission model may be implemented.

FIG. 6 shows a computer 200 for executing an integrated mission module. Computer 200 includes a processor 202, a volatile memory 204 and a non-volatile memory 206 (e.g., a hard disk). Non-volatile memory 206 stores operating system 210, data 212 for storing the integrated mission module, and computer instructions 214, which are executed by processor 202 out of memory 204 to execute the integrated mission module. In other examples, mission profiling may be enacted on multiple computers connected by a messaging infrastructure.

The integrated mission module is not limited to use with the hardware and software of FIG. 6; it may find applicability in any manual, visual or computing or processing environment and with any type of medium or machine that is capable of running the models or a computer program. The integrated mission module may be implemented in hardware, software, or a combination of the two. The integrated mission module may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the integrated mission module and to generate output information.

The integrated mission module may be implemented, at least in part, via any computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the integrated mission module.

The processes described herein are not limited to the specific embodiments described herein. For example, the processes are not limited to the specific processing order of FIGS. 1 to 5. Rather, any of the blocks of FIGS. 1 to 5 may be re-ordered, combined, repeated or removed, performed in series or performed in parallel, as necessary, to achieve the results set forth above. The models (human, system and operational node) may be replaced in the integrated mission model by actual entities that they represent. For example, a human model may be replaced by a human, a system model may be replaced by an actual system such as a camera and an operational node model may be replaced by an organization.

The integrated mission module may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

The output of the mission profiling process may be numerical, in the case of performance to a doctrinal goal, or graphical or auditory, electronic or a combination of these with the purpose of assisting doctrinal, vision and mission design decisions by a person or group of people.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A computer implemented method for mission profiling, comprising:
   generating, using a computer, a human model representing human activities including triggers for the human activities and outputs from the human activities;
   generating, using the computer, a system model representing system functions;
   generating, using the computer, an operational node model representing operational activities;
   integrating, using the computer, the human model, the system model and the operational model to form an integrated mission model to profile a mission, wherein the integrating comprises:
   mapping representations of the human activities and the representations of the system functions to representations of operational activities; and
   synchronizing the representations of the human activities and the representations of the system functions to the representations of the operational activities; and
   storing the integrated mission model on a machine-readable medium.

2. The method of claim 1 wherein integrating further comprises:
   mapping the representations of the human activities in the human model with the representations of the system functions in the system model.

3. The method of claim 2 wherein the mapping representations of the human activities with the representations of the system functions comprises synchronizing the representations of the human activities with the representations of the system functions.

4. The method of claim 1 wherein integrating further comprises integrating the human model, the system model and the operational node model into a mathematical representation.

5. The method of claim 4 wherein integrating the human model, the system model and the operational node model into the mathematical representation comprises integrating the human model, the system model and the operational model into an executable model.

6. The method of claim 5 wherein the executable model is a Colored Petri Net (CPN) model.

7. The method of claim 1, further comprising optimizing the integrated mission model.

8. The method of claim 1, further comprising validating the integrated mission model.

9. The method of claim 1, further comprising:
   using the integrated model to:
      validate the mission;
      validate a doctrine;
      validate an objective;
   modifying the mission based on validating the mission;
   modifying the doctrine based on validating the doctrine; and
   modifying the objective based on validating the objective.

10. The method of claim 9 wherein using the integrated model to validate the mission comprises validating a mission for a business.

11. The method of claim 9 wherein using the integrated model to validate the mission comprises validating a military mission.

12. The method of claim 1, further comprising deriving the representations of the human activities, the representations of the system functions and the representations of the operational activities from documentation.

13. The method of claim 1, further comprising deriving the representations of the human activities, the representations of the system functions and the representations of the operational activities from documentation comprises deriving the representations of the human activities, the representations of the system functions and the representations of the operational activities from Department of Defense Architecture Framework product views.

14. The method of claim 1, further comprising deriving the representations of the human activities, the representations of the system functions and the representations of the operational activities from interviews.

15. The method of claim 1, further comprising generating the mission, generating the mission comprising:
   selecting mission elements; and
   selecting a mapping between the mission elements.

16. The method of claim 15, further comprising fixing the mapping between the mission elements.

17. The method of claim 16, further comprising fixing a portion of the mission elements.

18. The method of claim 17, further comprising fixing the mission elements by iteratively generating additional mission integrated models.

19. The method of claim 1 wherein at least one model from the group consisting of the human model, the system model and the operational node model is replaced in the integrated mission model by an entity the model represents.

20. The method of claim 1 wherein generating the human model, the system model and the operational node model comprises using inputs from at least one of a corporate mission, a corporate mission statement, a financial goal, a performance goal, a policy manual, a procedural manual, a process diagram, a process manual, a subject matter expert interview, a flowchart, a written business process or an unwritten business process to generate at least one of the human model, the system model or the operational node model.

21. The method of claim 1 wherein generating the human model, the system model and the operational node model comprises using Department of Defense Architecture Framework (DODAF) products to generate at least one of the human model, the system model or the operational node model.

22. The method of claim 1, further comprising using the integrated model in a business environment.

23. The method of claim 1, further comprising using the integrated model in a military environment.

24. An apparatus for mission profiling, comprising:
a memory that stores executable instructions for generating and executing an integrated mission model; and
a processor that executes the instructions and performs a method for generating and executing an integrated mission model, the method comprising:
generating a human model representing human activities including triggers for the human activities and outputs from the human activities;
generating a system model representing system functions;
generating an operational node model representing operational activities;
integrating the human model, the system model and the operational model to form an integrated mission model to profile a mission, wherein the integrating comprises:
mapping representations of the human activities and representations of the system functions to representations of operational activities; and
synchronizing the representations of the human activities and the representations of the system functions with the representations of the operational activities; and
storing the integrated mission model on a machine-readable medium.

25. The apparatus of claim 24 wherein representations of the human activities are mapped with representations of the system functions.

26. The apparatus of claim 25 wherein the mapping of the representations of the human activities with the representations of the system functions comprises synchronizing the representations of the human activities with the representations of the system functions.

27. The apparatus of claim 24 wherein the integrated mission model comprises a mathematical representation.

28. The apparatus of claim 27 wherein the mathematical representation comprises an executable model.

29. The apparatus of claim 28 wherein the executable model is a Colored Petri Net (CPN) model.

30. The apparatus of claim 24 wherein the integrated model is configured to be used in a business environment.

31. The apparatus of claim 24 wherein the integrated model is configured to be used in a military environment.

32. The apparatus of claim 24 wherein the human model further comprises triggers for the human activities and outputs from the human activities.

33. An article comprising a machine-readable medium that stores executable instructions that when executed on a computer perform a method for generating and executing the integrated mission model, the medium comprising instructions for:
generating a human model representing human activities including triggers for the human activities and outputs from the human activities;
generating a system model representing system functions;
generating an operational node model representing operational activities;
integrating the human model, the system model and the operational model to form an integrated mission model to profile a mission, wherein the integrating comprises:
mapping representations of the human activities and representations of the system functions to representations of operational activities; and
synchronizing the representations of the human activities and the representations of the system functions with the representations of the operational activities; and
storing the integrated mission model on a machine-readable medium.

34. The article of claim 33 wherein the representations of the human activities are mapped with the representations of the system functions.

35. The article of claim 34 wherein the mapping of the representations of the human activities with the representations of the system functions comprises synchronizing the representations of the human activities with the representations of the system functions.

36. The article of claim 33 wherein the integrated mission model comprises a Colored Petri Net (CPN) model.

* * * * *

UNITED STATES PATENT AND TRADEMARK OFFICE
CERTIFICATE OF CORRECTION

PATENT NO. : 7,580,818 B2
APPLICATION NO. : 11/265802
DATED : August 25, 2009
INVENTOR(S) : De et al.

It is certified that error appears in the above-identified patent and that said Letters Patent is hereby corrected as shown below:

Col. 1, line 45, delete "module" and replace with -- model --.

Col. 1, line 52, delete "module" and replace with -- model --.

Col. 3, line 14, delete "representation" and replace with -- representation. --.

Col. 3, line 38, delete "has" and replace with -- as --.

Col. 4, line 6, delete "such a" and replace with -- such as a --.

Col. 5, line 13, delete "systems" and replace with -- system --.

Col. 5, line 56, delete ". Subprocess process 40" and replace with --. Subprocess 40 --.

Col. 5, line 62, delete "may found" and replace with -- may be found --.

Col. 6, line 25, delete "Subprocess process 60" and replace with -- Subprocess 60 --.

Col. 6, line 34, delete "that that the" and replace with -- that the --.

Col. 6, line 40, delete "operations" and replace with -- operation --.

Col. 6, line 47, delete "module" and replace with -- model --.

Col. 6, line 57, delete "module" and replace with -- model --.

Col. 7, line 7, delete "systems" and replace with -- system --.

Col. 7, line 21, delete "with-out" and replace with -- without --.

Col. 7, line 33, delete "performance strategic" and replace with -- performance, strategic --.

Col. 7, line 36, delete "though" and replace with -- through --.

Col. 8, line 9, delete "module." and replace with -- model. --.

Col. 8, line 12, delete "module," and replace with -- model, --.

UNITED STATES PATENT AND TRADEMARK OFFICE
CERTIFICATE OF CORRECTION

PATENT NO.        : 7,580,818 B2
APPLICATION NO.   : 11/265802
DATED             : August 25, 2009
INVENTOR(S)       : De et al.

Page 2 of 2

It is certified that error appears in the above-identified patent and that said Letters Patent is hereby corrected as shown below:

Col. 8, line 15, delete "module." and replace with -- model. --.

Col. 8, line 18, delete "module" and replace with -- model --.

Col. 8, line 23, delete "module" and replace with -- model --.

Col. 8, line 24, delete "module" and replace with -- model --.

Col. 8, line 32, delete "module" and replace with -- model --.

Col. 8, line 33, delete "module" and replace with -- model --.

Col. 8, line 55-56, delete "module" and replace with -- model --.

Col. 9, line 3, delete "module" and replace with -- model --.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,580,818 B2  Page 1 of 1
APPLICATION NO. : 11/265802
DATED : August 25, 2009
INVENTOR(S) : De et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Fourteenth Day of September, 2010

David J. Kappos
*Director of the United States Patent and Trademark Office*